(12) United States Patent
Syu et al.

(10) Patent No.: US 12,730,467 B2
(45) Date of Patent: Sep. 8, 2026

(54) VOLTAGE REGULATOR AND REFERENCE VOLTAGE GENERATION CIRCUIT

(71) Applicant: MEDIATEK INC., Hsinchu City (TW)

(72) Inventors: Jin-Yan Syu, Hsinchu City (TW); Chih-Chen Li, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 180 days.

(21) Appl. No.: 18/432,395

(22) Filed: Feb. 5, 2024

(65) Prior Publication Data

US 2024/0393816 A1 Nov. 28, 2024

Related U.S. Application Data

(60) Provisional application No. 63/504,217, filed on May 25, 2023.

(51) Int. Cl.
*G05F 1/575* (2006.01)
*G05F 1/46* (2006.01)
(Continued)

(52) U.S. Cl.
CPC .............. *G05F 1/575* (2013.01); *G05F 1/468* (2013.01); *H02M 1/0025* (2021.05); *H02M 3/156* (2013.01)

(58) Field of Classification Search
CPC ...... G05F 1/468; G05F 1/575; H02M 1/0025; H02M 3/156
See application file for complete search history.

(56) References Cited

U.S. PATENT DOCUMENTS 9,762,128 B2 9/2017 Zhang
10,205,390 B1 * 2/2019 Chakraborty ......... H02M 3/158
(Continued)

FOREIGN PATENT DOCUMENTS

CN 101155449 A 4/2008
CN 101853039 A 10/2010
(Continued)

OTHER PUBLICATIONS

Extended European Search Report dated Oct. 9, 2024, issued in application No. EP 24170985.6.
(Continued)

*Primary Examiner* — Lakaisha Jackson
(74) *Attorney, Agent, or Firm* — McClure, Qualey & Rodack, LLP

(57) ABSTRACT

A reference voltage generation circuit includes a voltage conversion circuit, a voltage divider, a reference voltage generator, an error amplifier, and a control circuit. The voltage conversion circuit is configured to convert an input voltage to an output voltage according to a first control signal. The voltage divider performs a voltage division operation on the output voltage to generate first and second feedback voltages. The reference voltage generator is configured to generate a reference voltage according to a second control signal. The error amplifier is configured to generate the first control signal according to a difference between the reference voltage and the first feedback voltage. The control circuit is configured to generate the second control signal according to the second feedback voltage and the reference voltage. In response to the second feedback voltage being decreasing gradually, the reference voltage is adjusted to trace the second feedback voltage.

19 Claims, 7 Drawing Sheets

(51) Int. Cl.
*H02M 1/00* (2006.01)
*H02M 3/156* (2006.01)

(56) References Cited

U.S. PATENT DOCUMENTS

| | | | | |
|---|---|---|---|---|
| 10,345,840 | B1 * | 7/2019 | Cao | G05F 1/575 |
| 2010/0134085 | A1 * | 6/2010 | Nishida | H02M 3/1563 323/285 |
| 2016/0077537 | A1 * | 3/2016 | Enjalbert | G05F 1/575 323/280 |
| 2018/0262113 | A1 * | 9/2018 | Asahi | H02M 3/156 |
| 2022/0416666 | A1 * | 12/2022 | Kawano | H02M 3/1588 |
| 2023/0082592 | A1 | 3/2023 | Yang | |
| 2023/0378871 | A1 * | 11/2023 | Saha | H02M 1/0032 |

FOREIGN PATENT DOCUMENTS

| | | | |
|---|---|---|---|
| CN | 102427295 | A | 4/2012 |
| CN | 110427064 | A | 11/2019 |
| CN | 115549474 | A | 12/2022 |
| TW | 201640795 | A | 11/2016 |
| TW | 201715832 | A | 5/2017 |

OTHER PUBLICATIONS

Zumbahlen, H., et al.; "Linear Circuit Design Handbook: Chapter 9: Power Management;" Aug. 2015; pp. 9.1-9.96.
Chinese language office action dated Dec. 25, 2024, issued in application No. TW 113115727.

* cited by examiner

VOLTAGE REGULATOR AND REFERENCE VOLTAGE GENERATION CIRCUIT

CROSS REFERENCE TO RELATED APPLICATIONS

This application claims the benefit of U.S. Provisional Application No. 63/504,217, filed May 25, 2023, the entirety of which is/are incorporated by reference herein.

BACKGROUND OF THE INVENTION

Field of the Invention

The invention relates to a voltage regulator, and more particularly to a reference voltage circuit for a voltage regulator.

Description of the Related Art

Generally, a voltage regulator provides a range of an output voltage. According to a received command for indicating reduction on the output voltage, the voltage regulator may perform a dynamic voltages scaling (DVS)-down operation to decrease the output voltage by a negative current flowing to the ground through an inductor and a pull-down transistor, which induces power consumption. In another case, the voltage regulator may perform a DVS-down operation in a free-running mode to decrease the output voltage toward a target level by discharging an output capacitor of the voltage regulator through a load. However, in the free-running mode, there may be a latency time between the time when a command related to a DVS-up operation is received and the time when the output voltage starts to increase, which results in that the output voltage cannot immediately increase in response to the command, thereby degrading the system performance.

BRIEF SUMMARY OF THE INVENTION

An exemplary embodiment of a voltage regulator is provided. The voltage regulator comprises a voltage conversion circuit, a voltage divider, a reference voltage generator, an error amplifier, and a control circuit. The voltage conversion circuit is configured to convert an input voltage to an output voltage according to a first control signal. The voltage divider is configured to perform a voltage division operation on the output voltage to generate a first feedback voltage and a second feedback voltage. The reference voltage generator is configured to generate a reference voltage according to a second control signal. The error amplifier is configured to generate the first control signal according to a difference between the reference voltage and the first feedback voltage. The control circuit is configured to generate the second control signal according to the second feedback voltage and the reference voltage. In response to the second feedback voltage being decreasing gradually, the reference voltage is adjusted to trace the second feedback voltage.

An exemplary embodiment of a reference voltage generation circuit is provided. The reference voltage generation circuit comprises a reference voltage generator and a control circuit. The reference voltage generator is configured to be controlled by a control signal to generate a reference voltage. The control circuit is configured to generate the control signal according to the feedback voltage and the reference voltage. The reference voltage is configured to trace the feedback voltage when the feedback voltage being decreased gradually.

An exemplary embodiment of a voltage regulator is provided. The voltage regulator comprises a voltage conversion circuit, a voltage divider, an error amplifier, and a reference voltage generation circuit. The voltage conversion circuit is configured to convert an input voltage to an output voltage at an output terminal of the voltage regulator according to a control signal. The voltage divider is coupled to the output terminal and configured to generate a first feedback voltage at a first node and a second feedback voltage at a second node. The first feedback voltage and the second feedback voltage are positively correlated with the output voltage, and the second feedback voltage is less than the first feedback voltage. The error amplifier comprises an inverting input terminal coupled to the first node, a non-inverting input terminal for receiving a reference voltage, and an output terminal for outputting the control signal. The reference voltage generation circuit is configured to generate the reference voltage. The reference voltage is reduced in response to a decrease in the second feedback voltage to trace the decrease in the second feedback voltage during the voltage regulator being scaling-down mode.

According to the voltage regulator, through the operations of the reference voltage generation circuit and the error amplifier, the reference voltage traces or tracks the decrease in the output voltage or the second feedback voltage in a scaling-down mode. When the voltage regulator exits from the scaling-down mode and enters a scaling-up mode, the reference voltage can increase from the current level rather than from a target level, such that. The output voltage can be immediately increased in response to the increasing of the reference voltage. Thus, the latency time from the between the time point when the voltage regulator enter the scaling-up mode and the time point when the output voltage starts to increase is shortened or eliminated.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
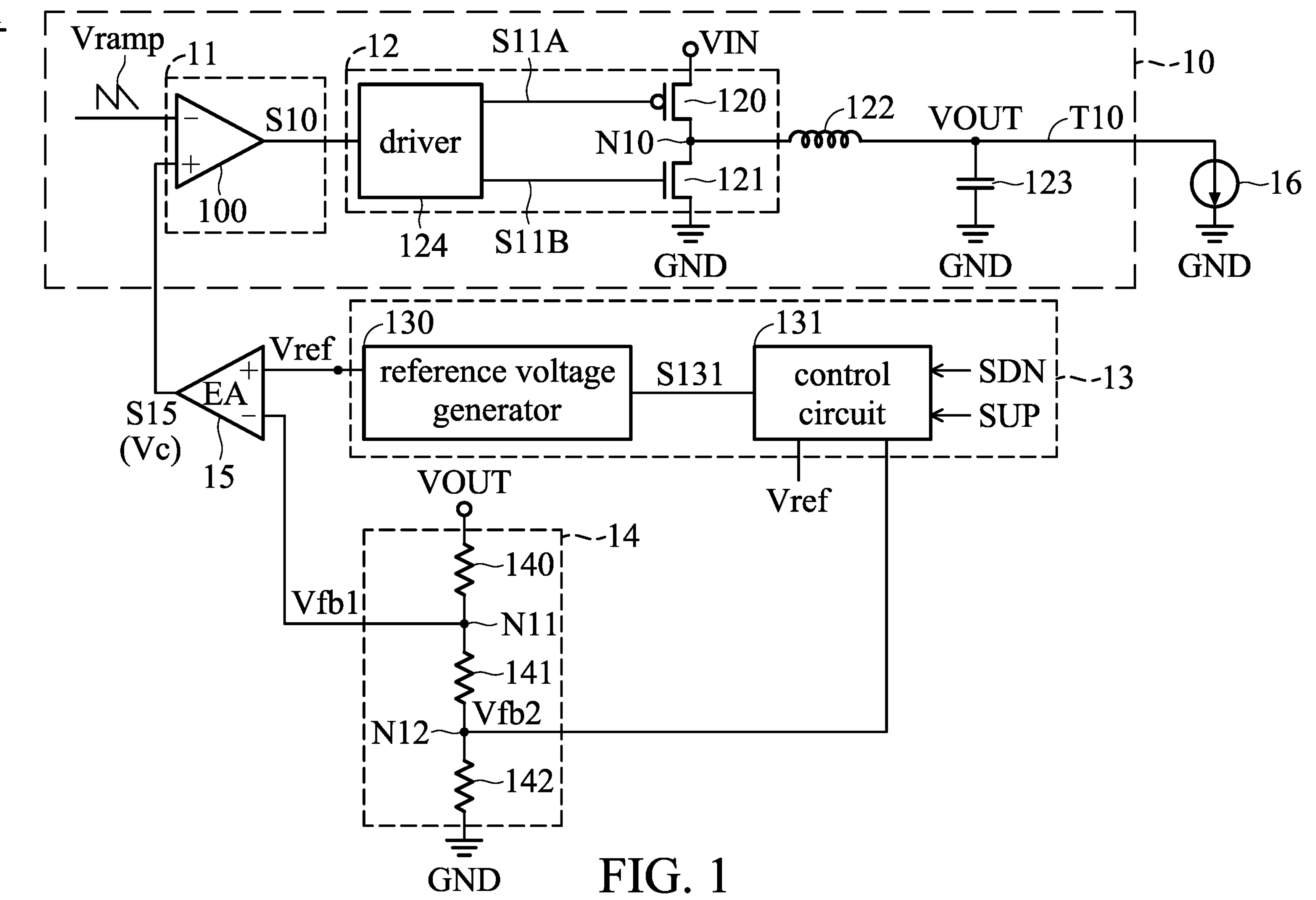
FIG. 1 shows one exemplary embodiment of a voltage regulator.

FIG. 1 shows an exemplary embodiment of a voltage regulator 1. In the embodiment, the voltage regulator 1 is, for example, a buck regulator. Referring to FIG. 1, the voltage regulator 1 comprises a voltage conversion circuit 10 (for example, the voltage conversion circuit 10 may comprise a pulse-width-modulation (PWM) controller 11, a driver stage 12, an inductor 122, and a capacitor 123, but the present disclosure is not limited to this), a reference voltage generation circuit 13, a voltage divider 14, and an error amplifier (EA) 15. The voltage conversion circuit 10 is configured to convert an input voltage VIN to an output voltage VOUT at an output terminal T10 according to a first control signal Vc (i.e., a control signal S15). It should be noted that the focus of this disclosure is on the generation of a reference voltage Vref, and the structure of the voltage conversion circuit 10 is not limited to the specific exemplary embodiments shown in the drawings.

In the embodiment of FIG. 1, the driver stage 12 comprises a driver 124, a P-type transistor 120, and a N-type transistor 121. The driver 124 is configured to generate driving signals S11A and S11B according to a PWM signal S10. The P-type transistor 120 comprises a first terminal for receiving the input voltage VIN, a second terminal coupled to a node N10, and a control terminal for receiving the driving signal S11A. The N-type transistor 121 comprises a first terminal coupled to the node N10, a second terminal coupled to a ground GND, and a control terminal for receiving the driving signal S110B. The inductor 122 has a first terminal coupled to the node N10 and a second terminal coupled to the output terminal T10. The capacitor 123 is coupled between the output terminal T10 and the ground GND. The on/off states of the P-type transistor 120 and the N-type transistor 121 are controlled by the driving signals S11A and S11B respectively, thereby charging or discharging the capacitor 123. Thus, the output voltage VOUT is generated at the output terminal T10 and charges are stored in the capacitor 123.

In an embodiment, the P-type transistor 120 and the N-type transistor 121 are implemented by a P-type metal-oxide-semiconductor (PMOS) transistor and a N-type metal-oxide-semiconductor (NMOS) transistor. The first terminal, the second terminal, and the control terminal of the P-type transistor 120 correspond to a source, a drain, and a gate of the PMOS transistor respectively. The first terminal, the second terminal, and the control terminal of the N-type transistor 121 correspond to a drain, a source, and a gate of the NMOS transistor respectively.

The voltage divider 14 is coupled to the output terminal T10 to receive the output voltage VOUT and configured to generate a first feedback voltage and a second feedback voltage which are positively correlated with the output voltage VOUT. In one example, the second feedback voltage may be same with the first feedback voltage. In another example, the second feedback voltage may be less than the first feedback voltage. Specially, the voltage divider 14 may be configured to perform a voltage division operation on the output voltage VOUT to generate feedback voltages Vfb1 and Vfb2 as shown in FIG. 1. In the embodiment, the voltage divider 14 comprises resistors 140-142, for example, the resistance value of resistor 141 is much less than that of each of the resistors 140 and 142. Based on the circuit structure of the voltage divider 14, the feedback voltage Vfb2 is less than (for example, slightly less than) the feedback voltage Vfb1. A first terminal of the resistor 140 receives the output voltage VOUT (i.e., coupled to the output terminal T10), and a second terminal thereof is coupled to a first node N11. A first terminal of the resistor 141 is coupled to the first node N11, and a second terminal thereof is coupled to a second node N12. A first terminal of the resistor 142 is coupled to the second node N12, and a second terminal thereof is coupled to the ground GND. A feedback voltage Vfb1 is generated at the first node N11, and a feedback voltage Vfb2 is generated at the second node N12. According to the circuit structure of the voltage divider 14, each of the feedback voltages Vfb1 and Vfb2 is directly proportional to the output voltage VOUT, however, the present disclosure is not limited to the voltage divider 14 as shown in FIG. 1. For example, any structure that ensures the feedback voltages Vfb1 and Vfb2 being positively correlated with the output voltage VOUT can be used as the voltage divider 14. In the embodiment as shown in FIG. 1, since the feedback voltage Vfb2 is less than Vfb1, thus the voltage regulator 1 can adjust the reference voltage in advance, which allows for a rapid response by the voltage regulator 1 when the output voltage VOUT decreases gradually (i.e., during the voltage regulator 1 being in a scaling-down mode).

The reference voltage generator 130 is configured to generate the reference voltage Vref according to a second control signal S131, and the reference voltage Vref can indicate a target level of the output voltage VOUT. Referring to FIG. 1, a non-inverting input terminal (+) of the error amplifier 15 receives the reference voltage Vref, and an inverting input terminal (−) thereof receives the feedback voltage Vfb1. The error amplifier 15 generates the control signal S15 at its output terminal according to a difference between the reference voltage Vref and the feedback voltage Vfb1.

The PWM controller 11 is configured to generate the PWM signal S10 according to the control signal S15 and a ramp signal Vramp. In the embodiment, the PWM controller 11 comprises a comparator 100. A non-inverting input terminal (+) of the comparator 100 receives the control signal S15, and an inverting input terminal (−) thereof receives the ramp signal Vramp. The comparator 100 is configured to generate the PWM signal S10 at its output terminal according to a result of a comparison between the control signal S15 and the ramp signal Vramp. As described above, the driver 124 generates the driving signals S11A and S11B according to the PWM signal S10, thereby controlling the P-type transistor 120 and the N-type transistor 121 to convert the input voltage VIN to the output voltage VOUT.

Based on the above operations, the target level of the output voltage VOUT is determined according to the reference voltage Vref. Thus, the change in the reference voltage Vref induces the change in the output voltage VOUT. In the embodiment, the reference voltage generation circuit 13 comprises a reference voltage generator 130 and a control circuit 131. The control circuit 131 receives the reference voltage Vref and the feedback voltage Vfb2, and is configured to generate a control signal S131 according to the reference voltage Vref and the feedback voltage Vfb2. In addition, the control circuit 131 may further receive a scaling-down signal SDN for indicating a scaling-down mode (for example, a dynamic voltage scaling (DVS) down (DN) mode) and a scaling-up signal SUP for indicating a scaling-up mode (for example, a DVS up (UP) mode). For example, once the scaling-down signal SDN is enabled, it indicates that the voltage regulator 1 is expected to reduce from the current level to a desired target level, for example, the output voltage VOUT will decrease gradually to the desired target level.

In the scaling-down mode, a load 16, which is coupled to the voltage regulator 1 at the output terminal T10, draws a current from the output terminal T10 so that the capacitor 123 is discharged through the load 16. Thus, the output voltage VOUT decreases gradually toward the desired target level. In the scaling-down mode, the control circuit 131 generates the control signal S131 to control the reference voltage generator 130 to generate the reference voltage, which is decreased in response to the decreasing of the output voltage VOUT or the feedback voltage Vfb2.

In the following paragraphs, the operation and structure of the control circuit 131 are described by referring to FIGS. 2-3.

Figure 2:
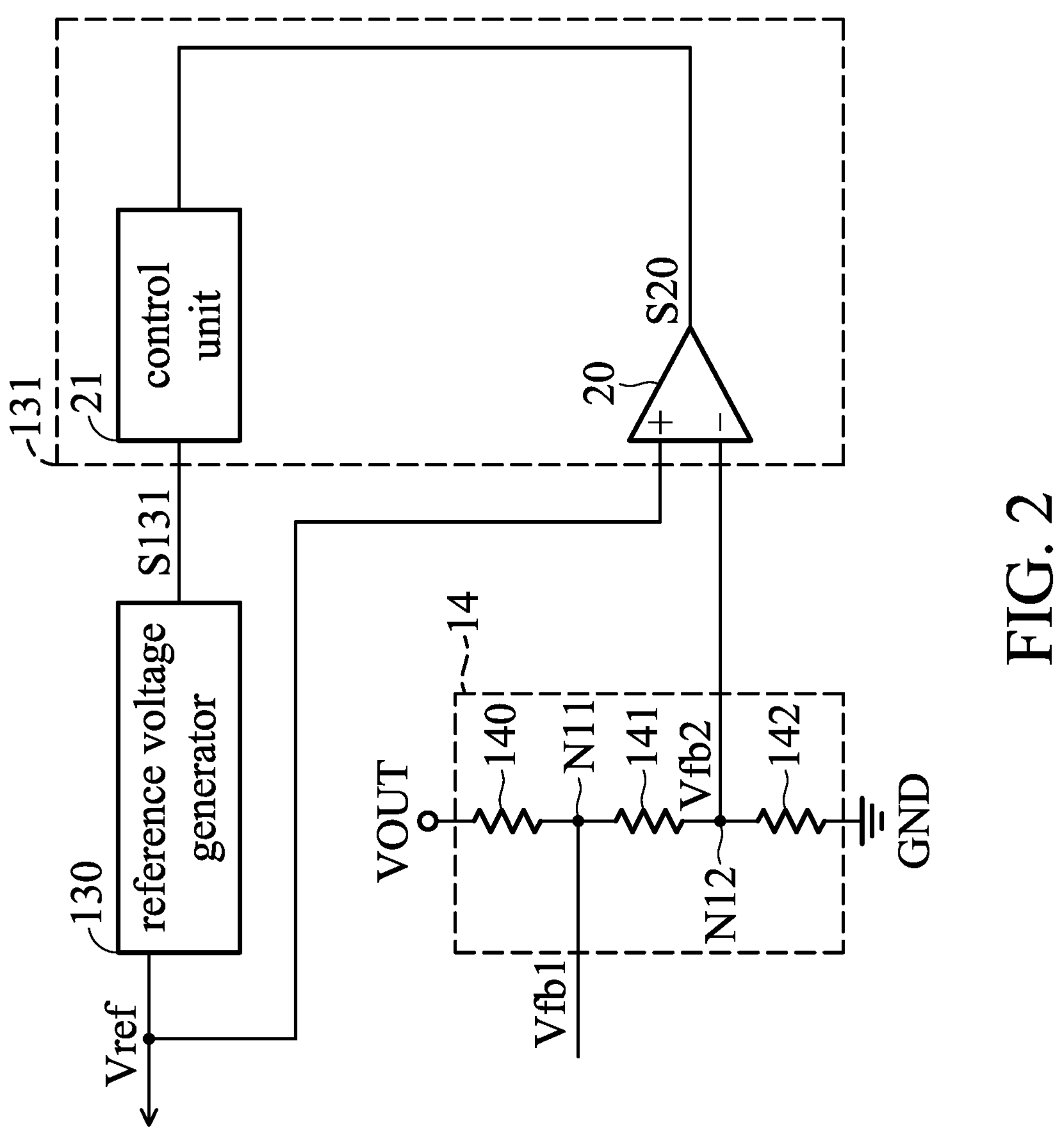
FIG. 2 shows one exemplary embodiment of a control circuit in the voltage regulator of FIG. 1.

FIG. 2 shows one exemplary embodiment of the control circuit 131. FIG. 3 shows a timing chart of the scaling-down signal SDN, the scaling-up signal SUP, and a comparison result signal S20 and further shows variations of the feedback voltage Vfb2 and the reference voltage Vref according to an exemplary embodiment. In order to clearly illustrate the operation of the control circuit 131, FIG. 2 also shows the voltage divider 14 and the reference voltage generator 130.

Referring to FIG. 2, the control circuit 131 comprises a comparator 20 and a control unit 21 (for example, a digital control unit). An inverting input terminal of the comparator 20 is coupled (for example, directly connected) to the second node N12 to receive the feedback voltage Vfb2, and a non-inverting input terminal thereof is coupled to the reference voltage generator 130 to receive the reference voltage Vref. The comparator 20 is configured to generate the comparison result signal S20 according to a result of a comparison between the reference voltage Vref and the feedback voltage Vfb2.

The control unit 21 is coupled to the output terminal of the comparator 20 to receive the comparison result signal S20 and further configured to generate the control signal S131 (for example, a digital control code) according to the comparison result signal S20. The control unit 21 is further configured to receive the scaling-down signal SDN and the scaling-up signal SUP (which are not shown in FIG. 2). In the embodiment, the scaling-down signal SDN and the scaling-up signal SUP are not enabled at the same time.

Figure 3:
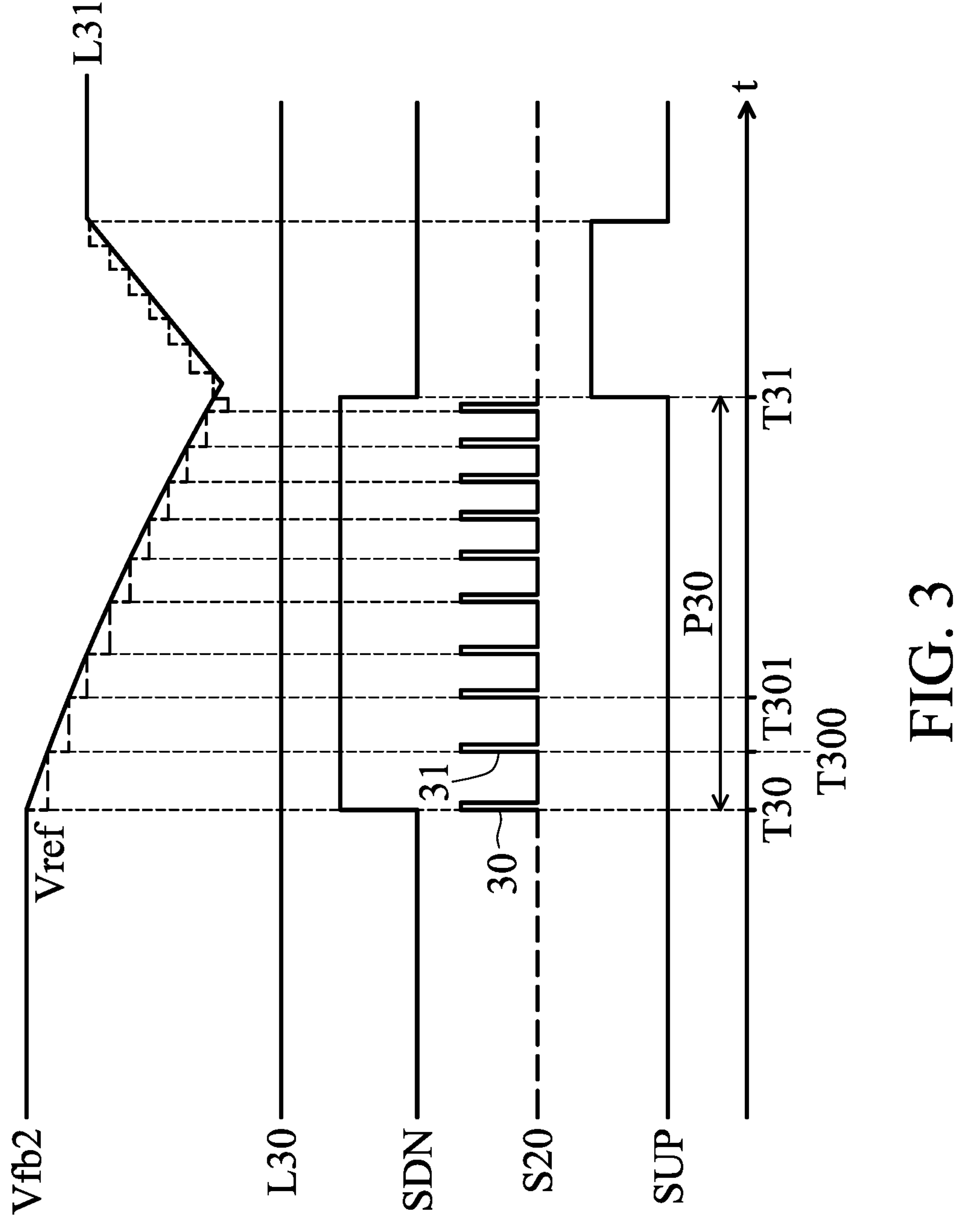
FIG. 3 shows a timing chart of main signals and variations of main voltages of the control circuit of FIG. 2 according to an exemplary embodiment.

Referring to FIG. 3, before the time point T30, the level of the feedback voltage Vfb2 is the same as the level of the reference voltage Vref. When the scaling-down signal SDN is enabled, for example, during a period P30 from the time point T30 to the time point T31, the voltage regulator 1 enters the scaling-down mode. In the scaling-down mode, the capacitor 123 is discharged through the load 16 because the load 16 draws a current from the output terminal T10 so that the output voltage VOUT decreases gradually. In response to the gradual decreasing of the output voltage VOUT, the feedback voltage Vfb2 that is directly proportional to the output voltage VOUT also decreases gradually toward a target level L30 corresponding to the scaling-down mode. At the time point T30, the reference voltage Vref may be greater than the feedback signal Vfb2 in response to a reduction in the feedback voltage Vfb2, and the comparator 20 may switch the comparison result signal S20 to a high voltage level from a low voltage level so that the comparison result signal S20 has a rising edge.

In the embodiment, the control unit 21 receives the scaling-down signal SDN and the comparison result signal S20. The control unit 21 may pre-determine a decreasing amount for the control signal S131 in the scaling-down mode and further pre-determine an increasing amount for the control signal S131 in the scaling-up mode. When the control unit 21 receives the enabled scaling-down signal SDN, the control unit 21 generates the control signal S131 according to the decreasing amount. When the control unit 21 receives the enabled scaling-up signal SDN, the control unit 21 generates the control signal S131 according to the increasing amount.

In the scaling-down mode, when the comparison result signal S20 has the rising edge (for example, at the time point T30), the control unit 21 is triggered to decrease the value of the control signal S131 by the predetermined decreasing amount. The reference voltage generator 130 is controlled by the control signal S131, which has decreased by the predetermined decreasing amount, to decrease the reference voltage Vref by a predetermined decreasing step. In the embodiment, the predetermined decreasing step for the reference voltage Vref may correspond to the predetermined decreasing amount for the control signal S131, in details, the predetermined decreasing step for the reference voltage Vref is determined by the predetermined decreasing amount for the control signal S131. In response to the reference voltage Vref decreasing by the predetermined decreasing step, as shown in FIG. 3, the reference voltage Vref becomes not greater than the feedback signal Vfb2, and the comparator 20 switches the comparison result signal S20 back to the low voltage level from the high voltage level so that the comparison result signal S20 has a falling edge. Thus, a short pulse 30 occurs on the comparison result signal S20 which can be regarded as the comparison result signal being enabled, and the control unit 21 may generate the control signal S131 in response to the enabled comparison result signal S20.

Referring to FIG. 3, from the time point T30, the feedback voltage Vfb2 continues decreasing gradually toward the target level L30. At the time point T300, the reference voltage Vref becomes greater than the feedback signal Vfb2 again in response to the continuous decreasing, thus, the comparator 20 switches the comparison result signal S20 to the high voltage level from the low voltage level again so that the comparison result signal S20 has another rising edge. When the comparison result signal S20 has the rising edge at the time point T300, the control unit 21 is triggered to decrease the value of the control signal S131 again by the predetermined decreasing amount. The reference voltage generator 130 is controlled by the decreased control signal S131 to decrease the reference voltage Vref again by the predetermined decreasing step. In response to the reference voltage Vref decreasing by the predetermined decreasing step, as shown in FIG. 3, the reference voltage Vref becomes not greater than the feedback signal Vfb2, and the comparator 20 switches the comparison result signal S20 back to the low voltage level from the high voltage level so that the comparison result signal S20 has another falling edge. At this time, a short pulse 31 occurs on the comparison result signal S20.

During the period P30 corresponding to the scaling-down mode, once the reference voltage Vref is greater than the feedback signal Vfb2, the comparator 20 enables the comparison result signal S20 so that the comparison result signal S20 has a rising edge. Each time when a rising edge occurs on the comparison result signal S20, the control unit 21 decreases the value of the control signal S131 once by the predetermined decreasing amount. The reference voltage generator 130 is controlled by the decreased control signal S131 to decrease the reference voltage Vref by the predetermined decreasing step.

According to the above operation, with the gradual decreasing of the feedback voltage Vfb2, the reference voltage Vref is decreased by the predetermined decreasing step each time when the value of the control signal S131 is decreased by the predetermined decreasing amount. Thus, in the scaling-down mode wherein the feedback voltage Vfb2 decreases gradually, the reference voltage Vref is adjusted or controlled to trace the feedback voltage Vfb2. Referring to FIG. 3, during the period P30, the reference voltage Vref is close to the feedback voltage Vfb2.

Referring to FIG. 3, before the feedback signal Vfb2 reaches the target level L30, for example, at the time point T31, the scaling-down signal SDN is disabled while the scaling-down signal SUP is enabled, the voltage regulator 1 exits from the scaling-down mode and enters the scaling-up mode. In the scaling-up mode, the operation of the comparator 20 does not affect the operation of the control unit 21, and the control unit 21 automatically increases the value of the control signal S131 by the predetermined increasing amount at every predetermined interval. As shown in FIG. 3, the reference voltage generator 130 is controlled by the increased control signal S131 to increase the reference voltage Vref by the predetermined increasing step at every predetermined interval.

In the scaling-up node, through the operations of the voltage conversion circuit 10 and the error amplifier 15 based on the increased reference voltage Vref, the output voltage VOUT increases gradually toward the desired target level. Referring to FIG. 3, the feedback voltage Vfb2 also increases gradually, since the feedback voltage Vfb2 is directly proportional to the output voltage VOUT. That is, in the scaling-up node, the reference voltage Vref is proactively raised, to elevate the output voltage VOUT.

According to the above embodiment, in the scaling-down mode, the reference voltage generation circuit 13 (specially, reference voltage generator 130) generates the reference voltage Vref that traces the feedback voltage Vfb2. Thus, in the scaling-down mode, the reference voltage Vref is close to the feedback voltage Vfb2. That is, in the scaling-down node, the reference voltage Vref is passively reduced in response to a decreasing in the output voltage VOUT, to trace or track the decrease in the output voltage VOUT or the feedback voltage Vfb2.

In the cases where the scaling-up mode is enabled (that is, the scaling-up signal is enabled) before the feedback voltage Vfb2 reaches the target level L30 of the scaling-down mode, since the reference voltage Vref is close to the feedback voltage Vfb2, the reference voltage Vref can increase from the current level (for example, the current level higher than the target level L30) rather than from the target level L30. In response to the reference voltage Vref closing to the feedback voltage Vfb2, the output voltage VOUT can be immediately increased, and it can be seen from FIG. 3, because the feedback voltage Vfb2 increases toward the target voltage L31 immediately when the scaling-up signal SUP is enabled. Thus, the latency time between the time point when the scaling-up signal SUP is enabled and the time point when the output voltage VOUT starts to increase is shortened or eliminated.

In the above embodiment, the comparison result signal S20 is significant only for the scaling-down node. Thus, the sections of the comparison result signal S20 during the periods excluding the period P30 when the scaling-down signal SDN is enabled are shown by dotted lines.

Figure 4:
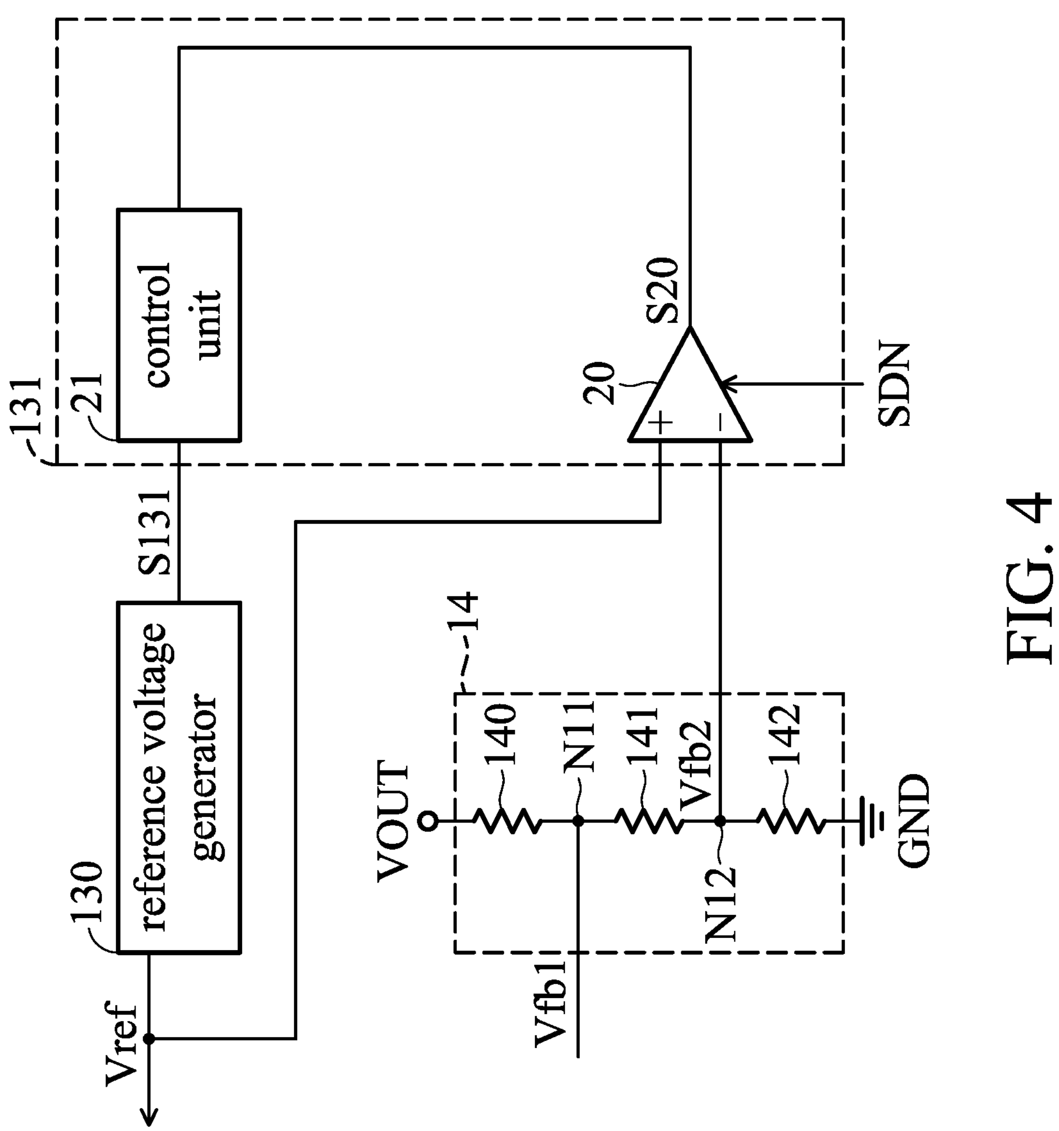
FIG. 4 shows one exemplary embodiment of a control circuit in the voltage regulator of FIG. 1.

In another embodiment, as shown in FIG. 4, the comparator 20 may be configured to receive the scaling-down signal SDN. When the scaling-down signal SDN is enabled to indicate that the voltage regulator 1 enters the scaling-down mode, the comparator 20 is enabled according to the enabled scaling-down signal SDN. In response to the enabling of the comparator 20, the comparison result signal S20 varies with the result of the comparison between the reference voltage Vref and the feedback voltage Vfb2. When the scaling-down signal SDN is disabled to indicate that the voltage regulator 1 does not operate in the scaling-down mode, the comparator 20 is disabled according to the disabled scaling-down signal SDN. In response to the disabling of the comparator 20, the comparison result signal S20 is at a predetermined level, for example, a low voltage level.

Figure 5:
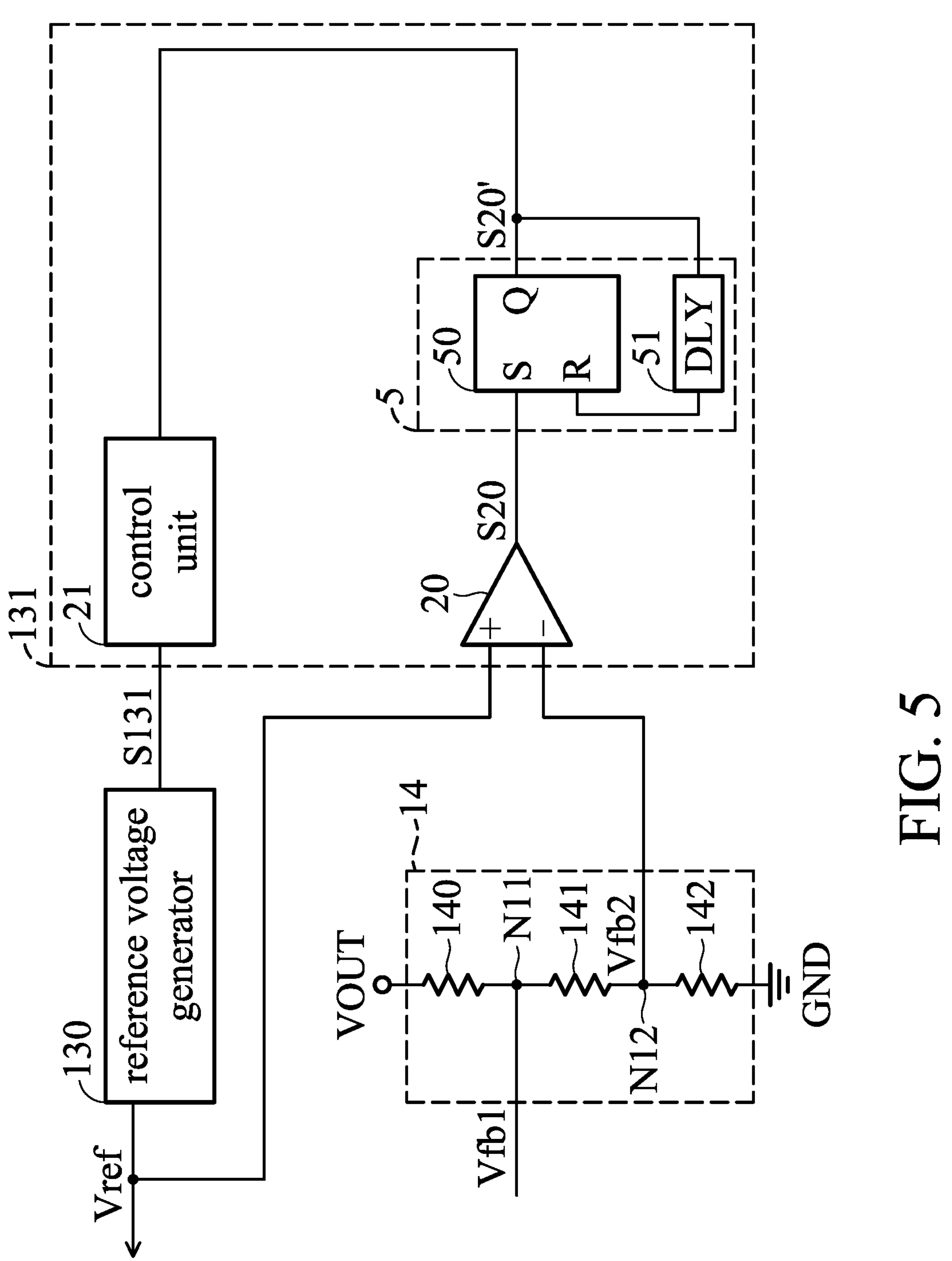
FIG. 5 shows one exemplary embodiment of a control circuit in the voltage regulator of FIG. 1.
Figure 6:
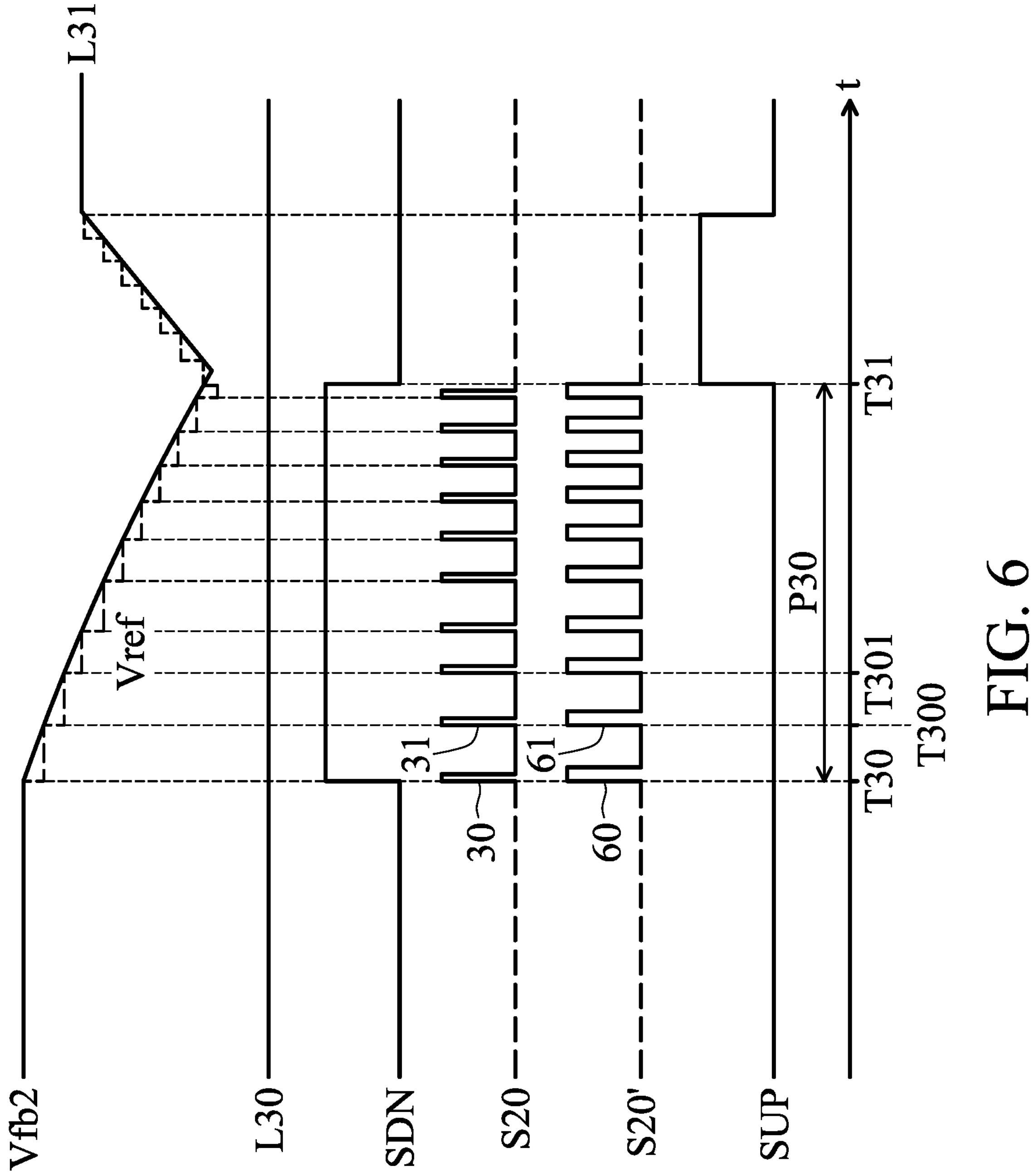
FIG. 6 shows a timing chart of main signals and voltages of the control circuit of FIG. 5 according to an exemplary embodiment.

In other embodiments, the sampling time of the control unit 21 for sampling its input signals is considered. In order to ensure that the control unit 21 can correctly sample the enabled comparison result signal S20, the control circuit 131 may further comprise a latch circuit 5 as shown in FIG. 5. The latch circuit 5 is coupled to the comparator 20. The latch circuit 5 receives the comparison result signal S20 and is configured to latch the comparison result signal S20, thereby extends the width of each pulse on the comparison result signal S20. Referring to FIG. 5, the latch circuit 5 comprises an SR flip-flop 50 and a delay circuit (referred to "DLY" in FIG. 5) 51. A setting terminal(S) of the SR flip-flop 50 receives the comparison result signal S20, and an output terminal (Q) thereof outputs the latched comparison result signal S20'. The delay circuit 51 is coupled between the resetting terminal (R) and the output terminal (Q) of the SR flip-flop 50. The delay circuit 51 is configured to provide a preset delay Tdelay. Based on the operations of the SR flip-flop 50 and the delay circuit 51, the width of pulses (for example, the pulses 60 and 61 as shown in FIG. 6) on the latched comparison result signal S20' are Tdelay wider/greater than the corresponding pulses (for example the pulses 30 and 31 as shown in FIG. 3) on the comparison result signal S20 respectively.

In the scaling-down mode, in response to the reference voltage Vref being greater than the feedback signal Vfb2 at the time point T30, the comparator 20 switches the comparison result signal S20 to the high voltage level from the low voltage level. In response to the high voltage level of the comparison result signal S20, the latched comparison result signal S20' outputted by the output terminal (Q) of the SR flip-flop 50 is enabled to switch to a high voltage level from a low voltage level so that the latched comparison result signal S20' has a rising edge. In response to the rising edge on the latched comparison result signal S20', the control unit 21 decreases the value of the control signal S131 by the predetermined decreasing amount, and the reference voltage generator 130 is controlled by the decreased control signal S131 to decrease the reference voltage Vref by the predetermined decreasing step. In response to the reference voltage Vref decreasing by the predetermined decreasing step, as shown in FIG. 6, the reference voltage Vref becomes not greater than the feedback signal Vfb2, and the comparator 20 switches the comparison result signal S20 back to the low voltage level from the high voltage level. At this time, the setting terminal(S) of the SR flip-flop 50 receives the comparison result signal S20 with the low voltage level. The delay circuit 51 delays the latched comparison result signal S20'. Through delaying the latched comparison result signal S20' by the delay circuit 51, the resetting terminal (R) of the SR flip-flop 50 will also receive a signal with the high voltage level within an additional preset delay Tdelay which is following the enabled comparison result signal S20. Thus, the latched comparison result signal S20' outputted by the output terminal (Q) of the SR flip-flop 50 can't switch to the low voltage level from the high voltage level until the additional preset delay Tdelay introduced by the delay circuit 51 has expired. As shown in FIG. 6, a pulse 60 occurs on the latched comparison result signal S20' and corresponds to the pulse 30 on the comparison result signal S20. Based on the operation of the latch circuit 5, the width of the pulse 60 is greater than the width of the pulse 30.

The other pulses on the latched comparison result signal S20' are induced according to the similar operation, and the related description is omitted here.

Figure 7:
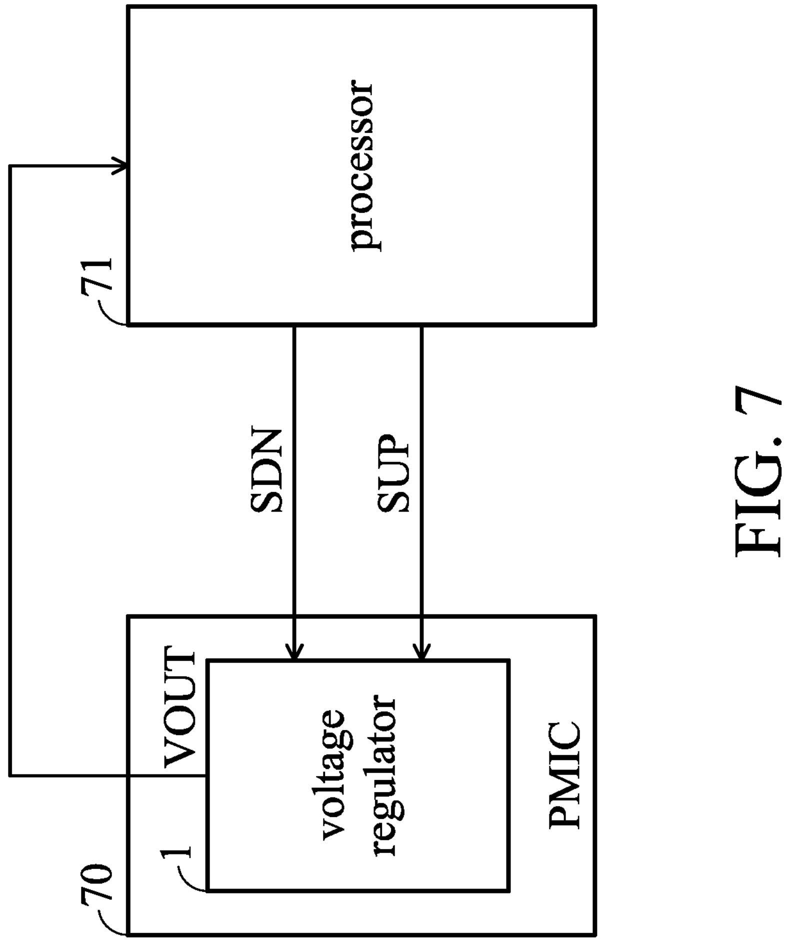
FIG. 7 shows an exemplary embodiment of an electronic device.

FIG. 7 shows an exemplary embodiment of an electronic device. Referring to FIG. 7, the electronic device 7 comprises a power management integrated circuit (PMIC) 70 and a processor 71. The PMIC 70 comprises the voltage regulator 1. The processor 71 generates the scaling-down signal SDN and the scaling-up signal SUP according to, for example, the operation frequency, the number of tasks, and the environment temperature of the electronic device 7. The processor 71 provides the scaling-down signal SDN and the scaling-up signal SUP to the voltage regulator 1 of the PMIC 70. The output voltage VOUT generated by the voltage regulator 1 is provided to the processor 71 as its supply voltage. In this embodiment, the processor 71 may serve as the load 16.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voltage regulator comprising:

a voltage conversion circuit configured to convert an input voltage to an output voltage according to a first control signal;

a voltage divider configured to perform a voltage division operation on the output voltage to generate a first feedback voltage and a second feedback voltage;

a reference voltage generator configured to generate a reference voltage according to a second control signal;

an error amplifier configured to generate the first control signal according to a difference between the reference voltage and the first feedback voltage; and a control circuit configured to generate the second control signal according to the second feedback voltage and the reference voltage, wherein in response to the second feedback voltage being decreased gradually, the reference voltage is adjusted to trace the second feedback voltage;

wherein the second feedback voltage is less than the first feedback voltage.

2. The voltage regulator as claimed in claim 1, wherein the control circuit comprises:

a comparator configured to perform a comparison operation on the second feedback voltage and the reference voltage to generate a comparison result signal; and a control unit configured to generate the second control signal according to the comparison result signal, wherein in a scaling-down mode where the second feedback voltage is decreased gradually, when the reference voltage is greater than the second feedback voltage, the comparator enables the comparison result signal, and wherein in response to the enabled comparison result signal, the second control signal is controlled to enable the reference voltage generator to decrease the reference voltage by a predetermined decreasing step.

3. The voltage regulator as claimed in claim 2, wherein the control unit is further configured to receive a scaling-down signal, and in response to the scaling-down signal being enabled, the voltage regulator enters the scaling-down mode.

4. The voltage regulator as claimed in claim 2, wherein:

the control unit is further configured to receive a scaling-up signal, in response to the scaling-up signal being enabled, the voltage regulator enters a scaling-up mode, the second control signal is controlled to enable the reference voltage generator to increase the reference voltage, in response to the reference voltage being increased, the output voltage is increased.

5. The voltage regulator as claimed in claim 4, wherein in the scaling-up mode, according to the second control signal, the reference voltage generator increases the reference voltage by a predetermined increasing step at every predetermined interval.

6. The voltage regulator as claimed in claim 2, wherein the control circuit further comprises:

a latch circuit configured to receive and latch the comparison result signal to generate a latched comparison result signal.

7. The voltage regulator as claimed in claim 6, wherein the latch circuit comprises:

an SR flip-flop comprising a setting terminal for receiving the comparison result signal, a resetting terminal, and an output terminal for outputting the latched comparison result signal; and a delay circuit coupled between the resetting terminal and the output terminal of the SR flip-flop.

8. The voltage regulator as claimed in claim 6, wherein in the scaling-down mode, when the reference voltage is greater than the second feedback voltage, a width of a pulse of the latched comparison result signal is greater than a width of a pulse of the comparison result signal.

9. The voltage regulator as claimed in claim 2, wherein the comparator is controlled by a scaling-down signal, and in response to the scaling-down signal being enabled, the voltage regulator enters the scaling-down mode, and the comparator is enabled.

10. The voltage regulator as claimed in claim 1, wherein the voltage conversion circuit comprises a capacitor, and the capacitor is discharged through a load coupled to the voltage regulator in a scaling-down mode.

11. The voltage regulator as claimed in claim 1, wherein the voltage divider comprises:

a first resistor comprising a first terminal for receiving the output voltage, and a second terminal coupled to a first node, wherein the first feedback voltage is generated at the first node;

a second resistor comprising a first terminal coupled to the first node, and a second terminal coupled to a second node, wherein the second feedback voltage is generated at the second node; and a third resistor comprising a first terminal coupled to the second node, and a second terminal coupled to a ground.

12. The voltage regulator as claimed in claim 1, wherein the voltage conversion circuit comprises:

a pulse-width-modulation (PWM) controller configured to generate a PWM signal according to the first control signal;

a driver configured to generate a first driving signal and a second driving according to the PWM signal;

a P-type transistor comprising a first terminal for receiving the input voltage, a second terminal coupled to a first node, and a control terminal for receiving the first driving signal;

a N-type transistor comprising a first terminal coupled to the first node, a second terminal coupled to a ground, and a control terminal for receiving the second driving signal;

an inductor comprising a first terminal coupled to the first node, and a second terminal coupled to an output terminal of the voltage regulator; and a capacitor coupled between the output terminal and the ground.

13. The voltage regulator as claimed in claim 12, wherein the PWM controller comprises:

a comparator comprising a non-inverting input terminal for receiving the second control signal, and an inverting input terminal for receiving a ramp signal.

14. A reference voltage generation circuit, comprises:

a reference voltage generator configured to be controlled by a control signal to generate a reference voltage; and a control circuit configured to generate the control signal according to a feedback voltage and the reference voltage, wherein the reference voltage is configured to trace the feedback voltage when the feedback voltage being decreased gradually;

wherein the control circuit comprises:

a comparator configured to perform a comparison operation on the feedback voltage and the reference voltage to generate a comparison result signal;

a latch circuit configured to receive and latch the comparison result signal to generate a latched comparison result signal; and a control unit configured to generate the control signal according to the latched comparison result signal;

wherein the latch circuit comprises:

an SR flip-flop comprising a setting terminal for receiving the comparison result signal, a resetting terminal, and an output terminal for outputting the latched comparison result signal; and a delay circuit coupled between the resetting terminal and the output terminal of the SR flip-flop.

15. The reference voltage generation circuit as claimed in claim 14, wherein in a scaling-down mode where the feedback voltage is decreased gradually, when the reference voltage is greater than the feedback voltage, the comparator enables the comparison result signal, and wherein in response to the latched comparison result signal, the control signal is controlled to enable the reference voltage generator to decrease the reference voltage by a predetermined decreasing step.

16. The reference voltage generation circuit as claimed in claim 15, wherein the reference voltage generation circuit is applicable to a voltage conversion circuit, the control unit is further configured to receive a scaling-down signal, and in response to the scaling-down signal being enabled, a voltage regulator enters the scaling-down mode.

17. The reference voltage generation circuit as claimed in claim 16, wherein:

the control unit is further configured to receive a scaling-up signal, in response to the scaling-up signal being enabled, the voltage regulator enters a scaling-up mode, and the control unit generates the control signal to control the reference voltage generator to increase the reference voltage, in response to the reference voltage being increased, an output voltage is increased.

18. The reference voltage generation circuit as claimed in claim 15, wherein the reference voltage generation circuit is applicable to a voltage conversion circuit, the comparator is controlled by a scaling-down signal, and in response to the scaling-down signal being enabled, a voltage regulator enters the scaling-down mode, and the comparator is enabled.

19. A voltage regulator comprising:

a voltage conversion circuit configured to convert an input voltage to an output voltage at an output terminal of the voltage regulator according to a control signal;

a voltage divider coupled to the output terminal and configured to generate a first feedback voltage at a first node and a second feedback voltage at a second node, wherein the first feedback voltage and the second feedback voltage are positively correlated with the output voltage, and the second feedback voltage is less than the first feedback voltage; and an error amplifier comprising an inverting input terminal coupled to the first node, a non-inverting input terminal for receiving a reference voltage, and an output terminal for outputting the control signal; and a reference voltage generation circuit configured to generate the reference voltage, wherein the reference voltage is reduced in response to a decrease in the second feedback voltage to trace the decrease in the second feedback voltage during the voltage regulator being scaling-down mode.

* * * * *